Nov. 7, 1967

P. L. HUNTER 3,351,838

AUTOMATIC BATTERY CHARGER USING RAMP
FUNCTION FOR ERROR SIGNAL REFERENCE
IN SCR CONTROL OF MULTIPHASE LOAD

Filed Nov. 9, 1964

INVENTOR.
PATRICK L. HUNTER

BY

Nov. 7, 1967

P. L. HUNTER 3,351,838

AUTOMATIC BATTERY CHARGER USING RAMP
FUNCTION FOR ERROR SIGNAL REFERENCE
IN SCR CONTROL OF MULTIPHASE LOAD

Filed Nov. 9, 1964

GATE SIGNAL SOURCE 110

PROTECTION CIRCUIT 122

INVENTOR.
PATRICK L. HUNTER
BY

Nov. 7, 1967

P. L. HUNTER 3,351,838

AUTOMATIC BATTERY CHARGER USING RAMP
FUNCTION FOR ERROR SIGNAL REFERENCE
IN SCR CONTROL OF MULTIPHASE LOAD

Filed Nov. 9, 1964

INVENTOR.
PATRICK L. HUNTER

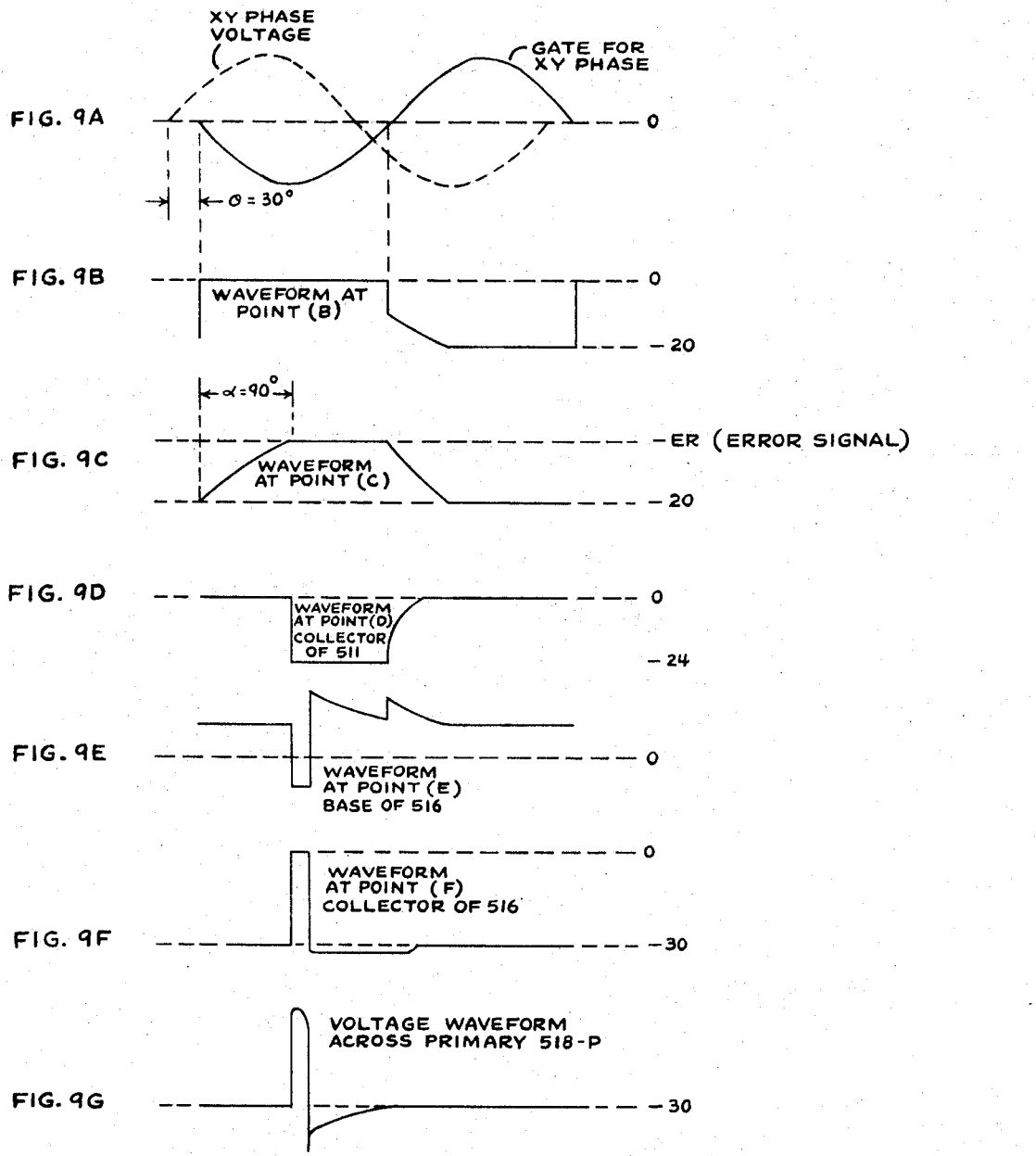

United States Patent Office 3,351,838
Patented Nov. 7, 1967

3,351,838
AUTOMATIC BATTERY CHARGER USING RAMP FUNCTION FOR ERROR SIGNAL REFERENCE IN SCR CONTROL OF MULTIPHRASE LOAD
Patrick L. Hunter, Worthington, Ohio, assignor to North Electric Company, Galion, Ohio, a corporation of Ohio
Filed Nov. 9, 1964, Ser. No. 409,855
21 Claims. (Cl. 321—5)

ABSTRACT OF THE DISCLOSURE

Control circuit for varying the supply of power to a load from a multi-phase source using pulse generators which internally generate a ramp function a predetermined period after the start of each phase cycle for comparison with an error signal which represents power deviation from a desired value, different value error signals thereby effecting a different time delay in generation of the firing pulses to SCR's which control the power supply to the load.

---

The present invention relates to control circuits for rectifier apparatus, and more specifically to a novel means for controlling the conduction of switching devices used in such circuits. This invention is particularly useful in controlling silicon controlled rectifiers which are used in rectifier apparatus to provide a constant direct voltage output.

In many fields such as telephony, rolling mills, motor control, and electroplating, by way of example, a source of direct current is required which is capable of supplying a constant output voltage for variable conditions of input voltage and load current.

One possible method of providing a constant load voltage includes inserting a variable resistance in the output circuit while yet another includes controlling the secondary voltage of a transformer connected between the alternating current source and the load. Both methods are undesirable when high power is required since in the first method, a large amount of power is lost in the controlling resistance, and in the second method, expensive auxiliary equipment is required. Other means of providing improved voltage output control include the use of switching devices, such as ignitrons, thyratrons and silicon controlled rectifiers. Each of such devices includes an anode element, a cathode element, and a gate or control element, and in the absence of a control signal the device will block current flow in any direction. With the receipt of a control signal of the correct magnitude a large current flow is provided which is limited only by the load resistance. After conduction begins, reducing the control or gate signal level has no effect on the anode current, and the non-conductive state can be restored only by reversing the current flow from anode to cathode or reducing it below the sustaining level, normally a low value.

When used with an alternating current anode voltage, the devices are turned off or returned to their non-conductive state when the anode current approaches a negative value. The exact time during the cycle when the current approaches a negative value is a function of the type of load circuit. If the device is excited by a sufficiently large gate voltage (i.e., firing voltage) at any time during the positive alternating current half cycle, it will begin to conduct and remain conductive as long as the anode current is positive whether or not the gate voltage remains at the firing level. By varying the time at which the device begins to conduct (i.e., is fired) in each half cycle, the average direct current voltage at the load can be varied from zero to a maximum value which is determined by the magnitude of the alternating current signal applied to the anode of the switch device. It will be noted that such devices offer economy as well as control since relatively small power is dissipated by the device during operation. When the device is turned off in each half cycle, the small reverse leakage current results in negligible power loss. When it is fired and conducts, little power is lost since the device has a low forward voltage drop (typically one volt drop from anode to cathode is experienced in silicon controlled rectifiers).

In typical rectifier arrangements, a transformer supplies power from an alternating current source to switching devices, such as thyratrons, ignitrons, or silicon controlled rectifiers which provide a controlled amount of output current for each cycle of input current. The output of the switching circuit is connected to a filter to provide a steady direct current signal which, in turn, is connected to the load. Feedback control means connected between the load and the gate of each switching device advance or delay the firing time (i.e., cut back angle) of each switch depending on whether more or less voltage is required across the load. This method can be used to provide highly regulated output voltage control or current control.

In many applications such feedback control means must be capable of detecting minute changes in load voltage and correcting the cut back angle of said switching devices to maintain a constant voltage output for wide ranges of input voltage and load current conditions. In power supplies for telephone systems, for example, design of the output voltage detector circuit in the control means is especially critical since minute variations in output voltage must be detected to provide acceptable control while the current load of telephone equipment varies rapidly over a wide range.

In certain prior art arrangements semiconductor components were used in such control circuitry because of their low power consumption and long life. The difficulty of utilizing semiconductor equipment to detect and amplify minute differences in direct current voltage levels and maintain gain stability, however, is well appreciated in the art. That is, semiconductor characteristics change with temperature and some degradation in characteristics result with aging, and it is difficult to achieve the high degree of stability needed for accurate voltage detection and amplification. By way of brief example, the base to emitter voltage of a transistor may change 20 to 30 percent over a temperature range from 32 to 110 degrees Fahrenheit.

Control means also must be provided for limiting the output current at a predetermined maximum value to protect both the rectifier equipment and the equipment comprising the load. It is further desirable to provide means which terminate the operation of the rectifier when one or more of the input phases driving the rectifier fail since the rectifier equipment can only provide satisfactory control when all phases are within specified limits.

It is also necessary to provide an accurate timing circuit and pulse circuit which will fire the rectifier switching devices at a closely controlled time in each cycle of the alternating current input voltage. This time must be controlled in response to a signal from the detector and amplifier in the feedback control circuit. The output of the pulse circuit must provide a pulse with fast rise time and sufficient duration and magnitude to ensure efficient firing of the silicon controlled rectifiers.

In multi-phase rectifier circuits which use silicon controlled rectifiers to control each phase the feedback control circuit must provide accurate control to maintain a balance of power flow in each controlled rectifier. An unbalanced control may cause undesirable performance and may result in rectifier failure. An unbalance may cause an excessive output ripple voltage, may cause overheating in a device, or may result in driving a transformer into magnetic saturation.

The output of the pulse generators must be free of noise and transients which can cause firing the silicon controlled rectifier at incorrect times during the alternating current cycle. In certain prior art arrangements the pulse generators can be fired by transients, noise, or harmonics which may be superimposed on the alternating current input voltage to the rectifier. It is desirable to minimize the effects of these signals so they cannot falsely trigger the pulse generators.

Accordingly, it is an object of the present invention to provide an improved error detector and amplifier circuit with stable gain to generate an output signal in response to minute errors in the direct current output voltage of the rectifier equipment.

It is an additional object of the present invention to provide a novel stable timing circuit to determine the time delay for firing of each controlled rectifier in response to the signal from the detector and amplifier circuit.

It is another object of this invention to provide novel pulse generator means, with output pulses of fast rise time and sufficient magnitude and duration to provide efficient firing of the silicon controlled rectifiers.

It is another object of this invention to provide a means for minimizing the undesirable effects on the pulse generator output due to noise transients and harmonics on the alternating current input voltage.

It is another object of this invention to provide timing and pulse circuits of improved stability to maintain a balance of power flow in each silicon controlled rectifier.

It is yet another object of this invention to provide means for limiting the current output of a rectifier circuit for such arrangement at a predetermined exact value.

It is another object of this invention to provide novel means for protecting said switching devices in a new and novel manner when a phase of the alternating current input signal fails.

The preceding objects achieved by the present invention will become apparent with reference to the following specification and accompanying drawings which disclose basic embodiments of the structure and in which.

Figure 3:
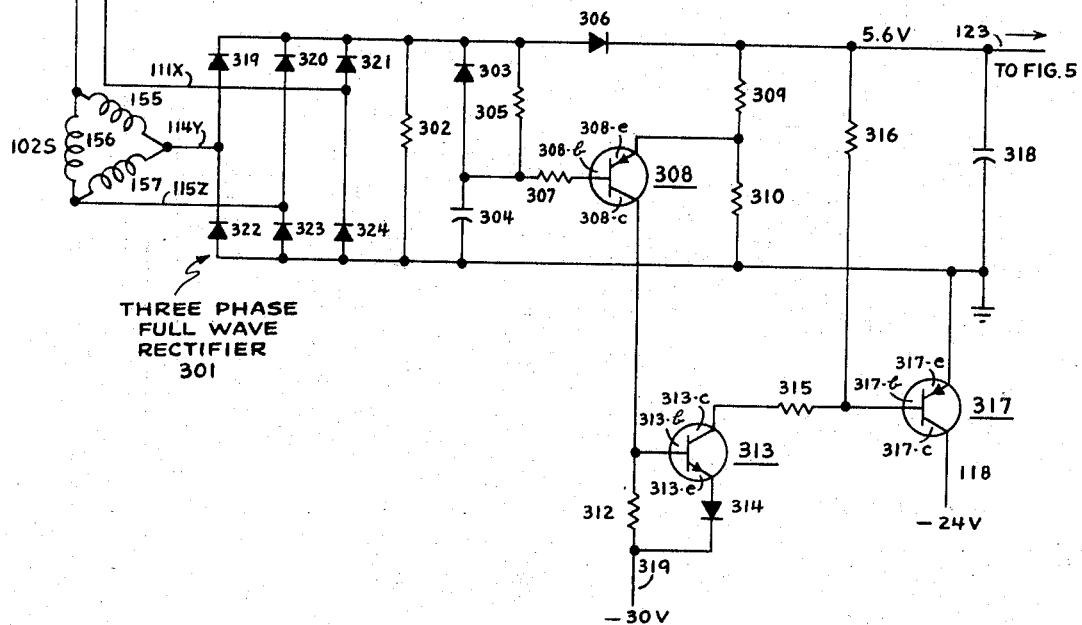
Figure 4:
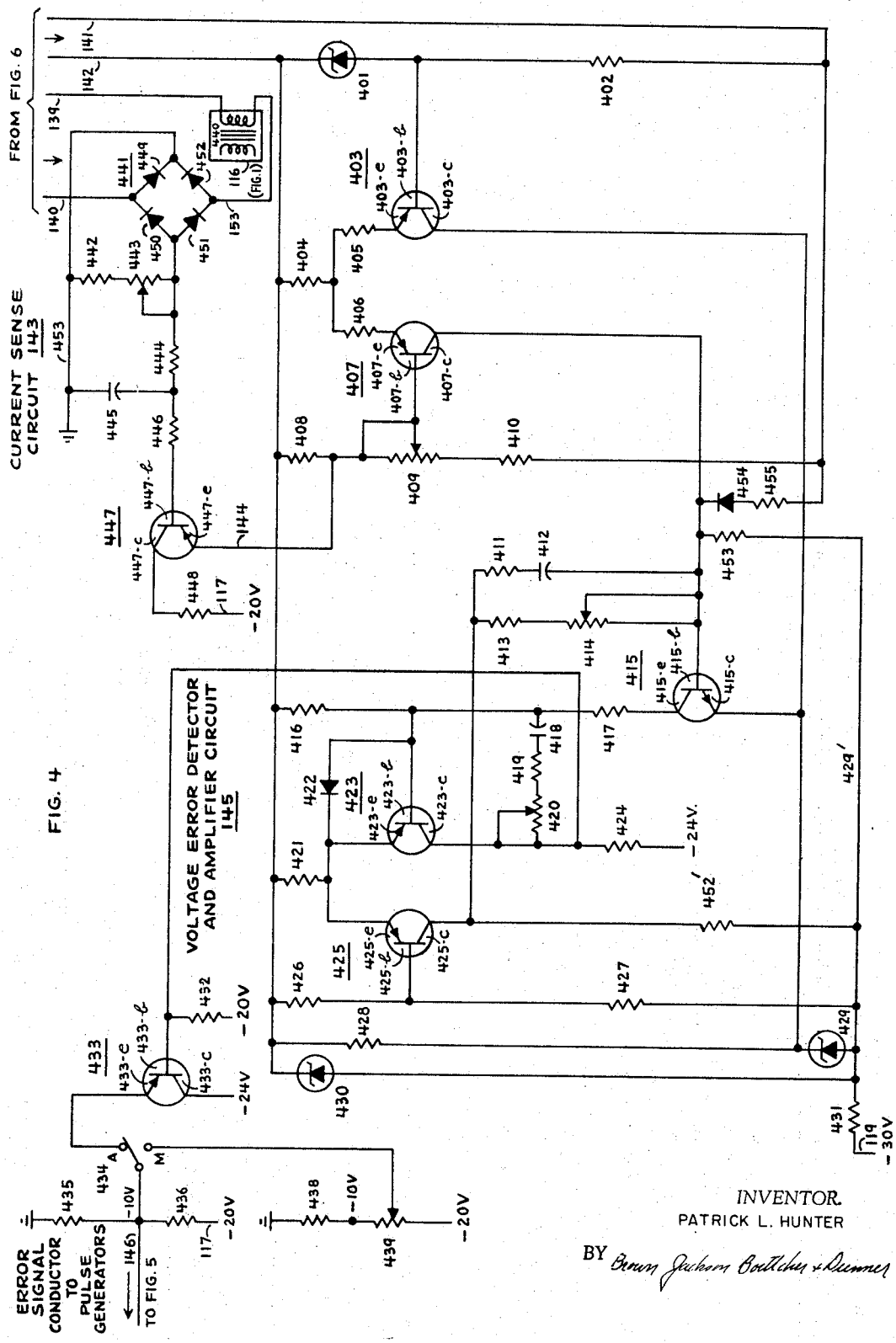
Figure 5:
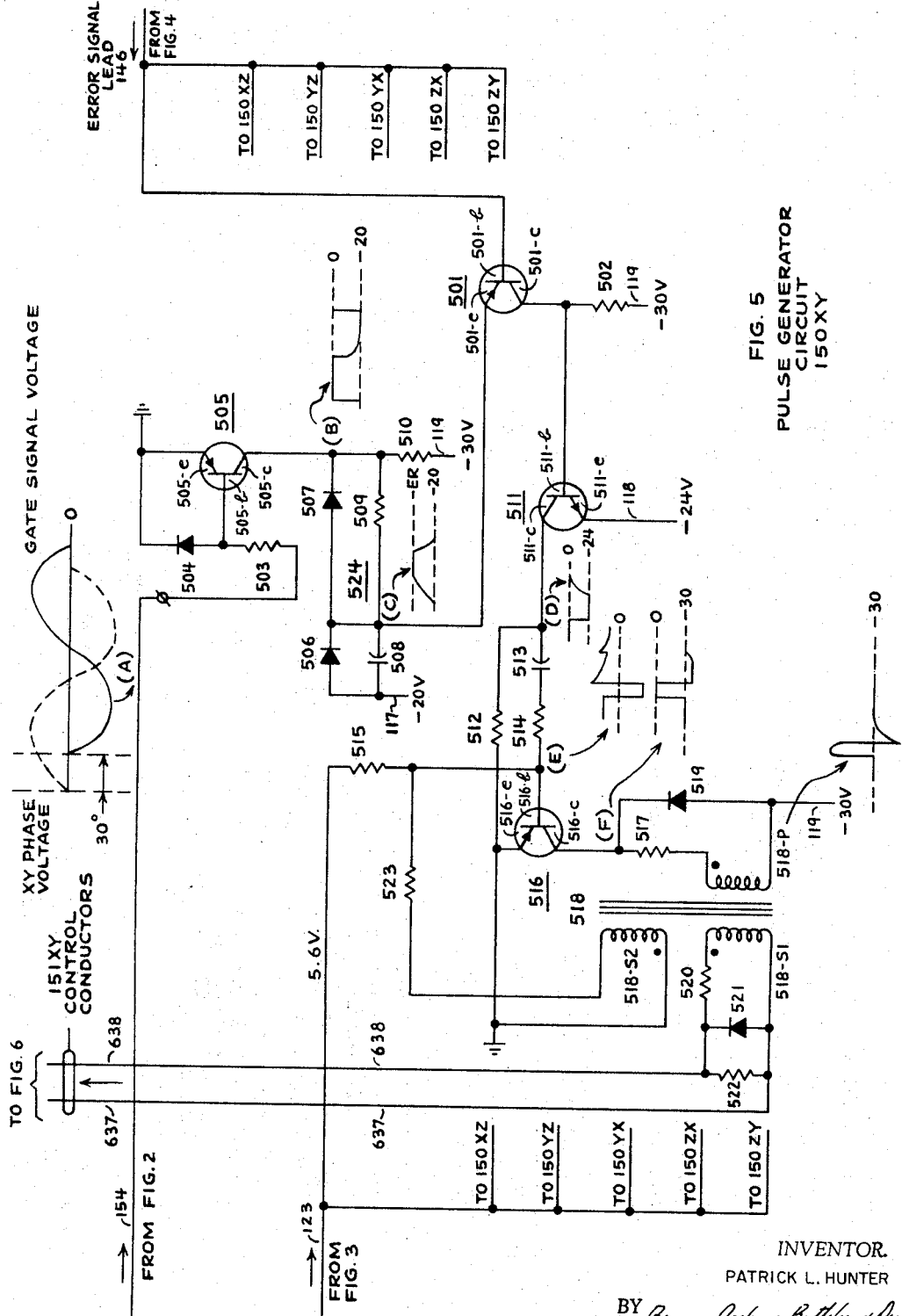
Figure 6:
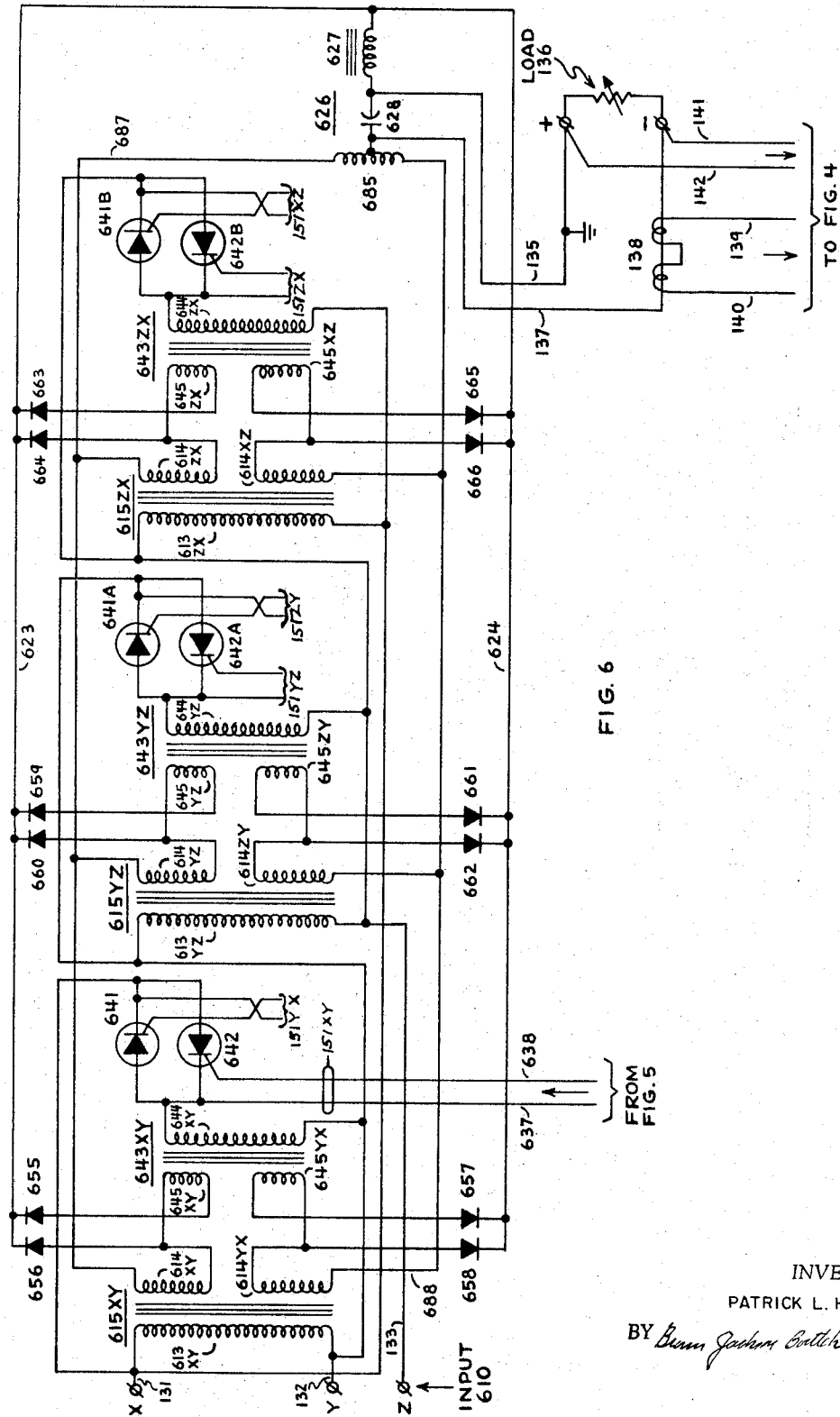

FIGURE 3 sets forth a novel protection circuit which prevents firing of the silicon controlled rectifiers if an input phase fails;

FIGURE 4 sets forth a novel voltage error detector, amplifier and current sensing device;

FIGURE 5 shows a novel pulse generator means for providing gate pulses to its silicon controlled rectifiers;

FIGURE 6 shows a main power supply circuit which was disclosed in detail in patent application, Ser. No. 311,053, filed Sept. 24, 1963, by Dr. W. H. Bixby, and the manner of connection of the novel means of FIGURES 1–5 to control the same;

FIGURES 7, 8A, 8B and 9A–9G show waveforms of the voltages which occur at various points in the circuits of FIGURES 1–6, as set forth in more detail hereafter; and FIGURE 10 illustrates the manner of placing FIGURES 2–6 to constitute a system.

Description of main supply

As an aid to understanding the novel control circuit 160 (FIGURE 1) shown in greater detail in FIGURES 2–5, initial reference is made to the main power supply circuit general 134 and to the main power supply circuit proper 134' which is controlled by control circuit 160. The main power supply circuit proper as shown in one embodiment of FIGURE 6 may comprise a plurality of main transformers 615xy, yz, zx, that provide the minimum voltage to the load, and a plurality of silicon controlled rectifiers 641, 642, 641A, 642A, 641B, 642B coupled with booster transformers 643xy, yz, zx to provide additional variable voltage in series with the minimum voltage of the main transformers. This arrangement is particularly useful when it is only necessary to hold the output voltage within predetermined limits for changes of input voltage and load current conditions. As explained in detail in the above identified application, substantial advantages of cost and size are possible in this arrangement which cannot be achieved when the silicon controlled rectifiers or any equivalent switching device are connected directly to the main transformers in a circuit which does not include the booster transformers. As will become apparent, however, the present invention will work equally well with any suitable rectifier arrangement and is adaptable for use with an input voltage with any number of phases.

With more specific reference now to the embodiment set forth in FIGURE 6, the three-phase alternating current source XYZ there shown provides energizing current for main transformers 615XY, 615YZ, 615ZX, which are connected in the three different phases XY, YZ, ZX, respectively. The power output of the three main transformers 615XY, 615YZ, 615ZX, is extended over filter network 626 and interphase reactor 685 to load 136 shown for simplicity as a variable resistance. This load may comprise a battery supplying power to a telephone exchange, for example. Control means 160 has input conductors 139, 140, 141, 142 connected to obtain signals from load 136 and is operative in response thereto to provide control signals over six associated output circuits (151XY, 151XZ, 151YZ, 151YX, 151ZX, 151ZY) to each of six silicon controlled rectifiers (641, 642, 641A, 642A, 641B, 642B) each pair of silicon controlled rectifiers being operative to control the output in a different one of the three phases.

With reference to one phase, such as for example phase XY, it will be apparent that the conductors XY of input 610 are connected to the primary winding 613XY of main transformer 615XY. The secondary of transformer 615XY includes an upper winding 614XY and a lower winding 614YX, each of which is connected to the load 136 over associated oppositely-poled diodes 656, 658 respectively. The path for the upper winding 614XY, for example, may be traced from the lower terminal of winding 614XY over diode 656, conductor 623, inductance 627 in filter circuit 626, load resistance 136, conductor 137, the center tap of interphase reactor 685, conductor 687 to the upper terminal of winding 614XY.

Secondary winding 614YX has its upper terminal connected over diode 658 (which is poled in the direction opposite to diode 656, and therefore is conductive in the opposite half cycle of phase XY), over conductor 624, inductance 627, load resistor 136, conductor 137, the center tap of interphase reactor 685, conductor 688 and the lower terminal of winding 614YX. When a minimum load voltage is required, diodes 656, 658 are conductive during alternate half cycles of the phase XY to provide one phase of the required minimum voltage for the load resistor 136. The manner in which transformer 615XY along with 615YZ and 615ZX are operative to provide the minimum voltage requirements for the other phases, will also be apparent therefrom.

Figure 1:
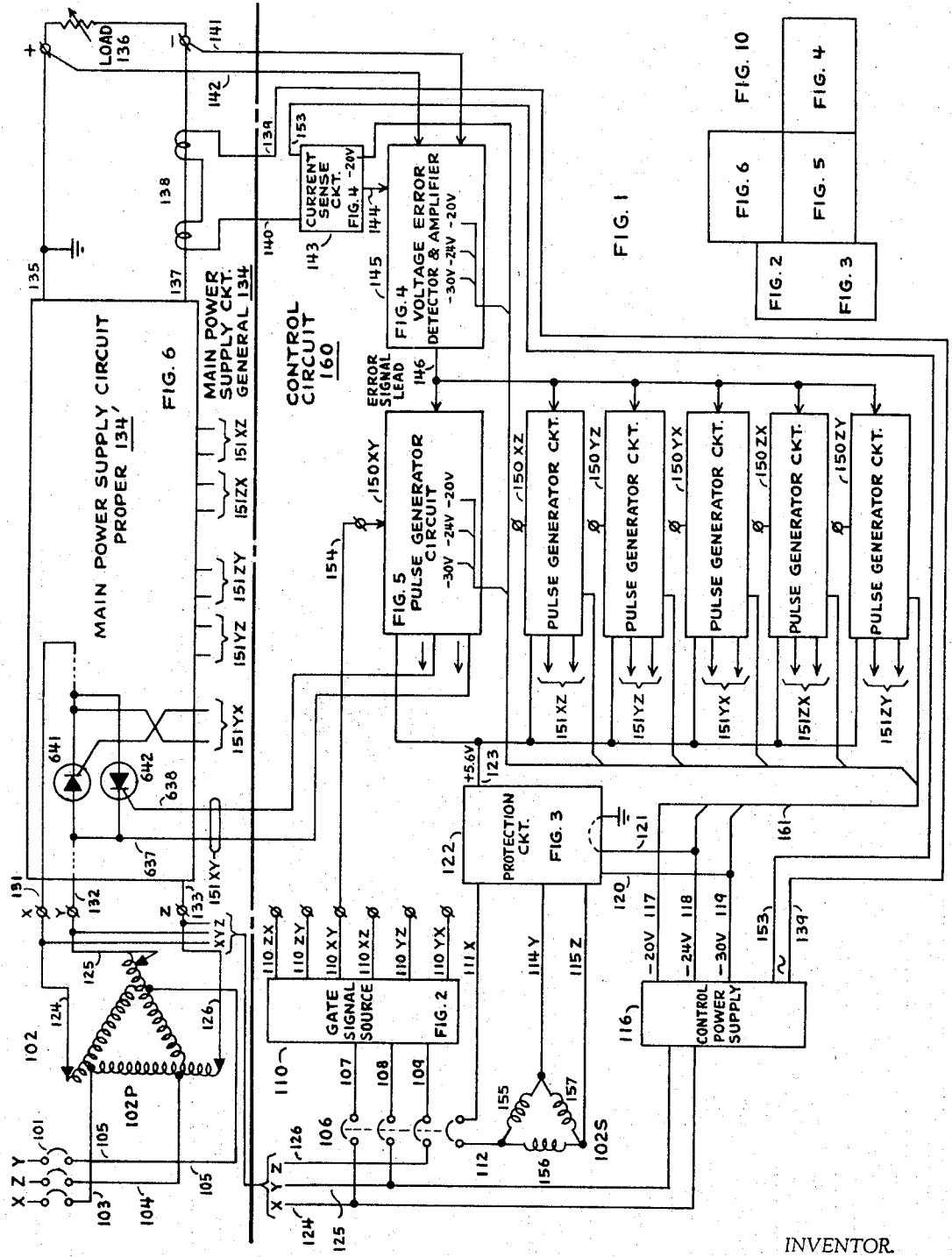
FIGURE 1 shows in blocks the novel control means of the invention including a set of silicon controlled rectifiers as used in a power supply circuit for a load.

Assuming that the load requirements are such that a voltage larger than the minimum is to be provided, the changing voltage across load resistance 136 controls error detector and amplifier means 145 (FIGURE 1) in control means 160 which provides an error signal to each of six pulse generators 150XY, XZ, YZ, YX, ZX, ZY which as shown in FIGURE 1 are also located in control means 160. Each of the six pulse generators is connected to one of the six silicon controlled rectifiers in the main supply. For instance silicon controlled rectifier 642 is connected over paths 637, 638 to pulse generator such as 150XY (FIGURE 5). The other silicon controlled rectifiers (641, 641A, 641B, 642A, and 642B) are connected over similar paths to the five remaining pulse generators.

The magnitude of the error signal produced by the voltage error detector and amplifier 145 regulates the amount of delay provided by each pulse generator before a voltage pulse is sent to the gate of its associated silicon controlled rectifier. Until such a pulse is sent to a silicon controlled rectifier, it remains non-conductive and current is provided to the load only by the main transformers in each phase. For instance when silicon controlled rectifier 642 and 641 in phase XY are turned off, minimum voltage is supplied by main windings 614XY and 614YX. There is no voltage induced in secondary windings 645XY, 645YX.

If the error signal is of such a value that there is no delay before each pulse generator fires a silicon controlled rectifier, current is transferred to the load by the secondary transformers 643XY, YZ, ZX during the entire cycle of the input voltage, and the load voltage is consequently increased to a maximum value. If on the other hand, the error signal is of such a value that it produces some delay before each pulse generator fires its silicon controlled rectifier, the secondary transformers will supply voltage to the load for only part of the input voltage cycle and the load voltage will be decreased to a value less than the maximum. For instance in phase XY, after silicon controlled rectifier 642 is fired, voltage is supplied to the load from both main winding 614XY and secondary winding 645XY.

With the firing of silicon controlled rectifier 642, a path is completed from source XYZ over conductor X, silicon controlled rectifier 642, the primary winding 644XY, and conductor Y. From the resultant induced voltage in winding 645XY, diode 655 conducts, diode 656 is cut off, as will be explained in detail later, and the voltage provided by transformer windings 614XY and 645XY over diode 655 to load resistor 136 is an increased voltage as compared to that provided by 614XY by an amount related to the period of conduction (and cut back angle) or silicon controlled rectifier 642 during such cycle. Silicon controlled rectifier 641 is controlled in a similar manner in the negative half cycle of phase XY, and the resultant voltage induced in transformer winding 645YX effects conduction of diode 657 (cutoff of diode 658) and provides voltage to the load from the outputs of transformer windings 614YX and 645YX, the value of the total voltage being determined by the period of conduction of silicon controlled rectifier 641 in the negative half cycle.

The manner in which the control means 160 effects operation of the respective phases YZ and ZX to provide voltage over diodes 659, 661 for phase YZ and over diodes 663, 665 for phase ZX will be apparent from the preceding disclosure.

The manner in which the voltages from phases XY, YZ and ZX combine to produce the load voltage will now be described in detail to facilitate the explanation of operation of the pulse generators 150XY, XZ, YZ, YX, ZX, ZY means 160.

Figure 7:
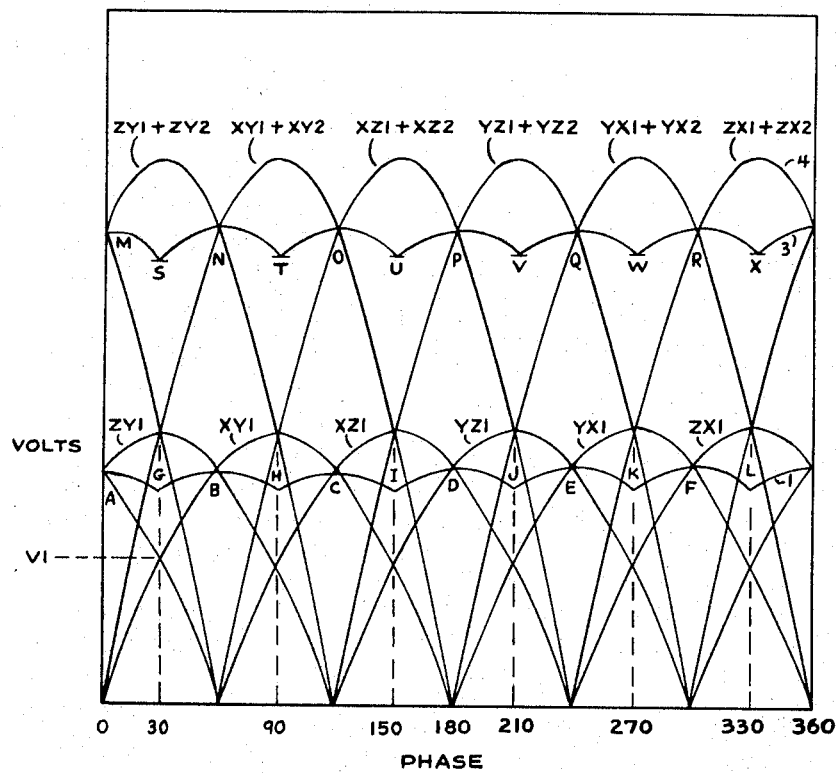

Referring now to FIGURE 7, the voltage waveforms provided in secondary transformers 614XY, 614YX, 614YZ, 614ZY, 614ZX, and 614XZ are shown as curves XY1, YX1, YZ1, ZY1, ZX1, and XZ1. Voltages YX1, ZY1, and XZ1 are negative at input 614, but are applied to the load resistor 136 as positive voltages through the rectifying action of their associated diodes 658, 662, and 666. A complete 360 degree cycle of input voltage for any phase is therefore shown as two positive half cycles in FIGURE 7. For instance, a complete cycle of phase XY is illustrated by curves XY1 and YX1.

The waveform provided to filter 626 by all three phases for minimum voltage requirements is shown by curve 1 in FIGURE 7. It will be remembered that for minimum voltage requirements only the main windings in each phase are operative. For instance in phase XY, windings 614XY and 614YX have induced voltages while windings 645XY and 645YX have none since silicon controlled rectifiers 642 and 641 are not conducting.

There are six maximum and minimum points in the output voltage waveform for each 360 degree cycle of each input phase. For instance in a complete cycle of phase XY denoted by curves XY1, YX1 there are maximum points such as A, B, C, D, E, F and minimum points G, H, I, J, K, L on curve 1. As is well known in the art, a double-Y connected rectifier circuit, such as the one shown in FIGURE 6, with an interphase reactor such as 685 is able to conduct current to the load through two diodes simultaneously. This type of circuit is especially advantageous where large currents must be used since the current load is shared by two diodes. The current carrying requirement of each diode is therefore reduced and a smaller, lower-cost diode may be used to replace the one which would be required by a circuit with only one diode conducting at a time.

The operation of phases YZ and ZX will be apparent from the following explanation of the diode conducting pairs for a complete cycle of phase XY when a minimum voltage is required across the load. With continued reference to FIGURE 7, from phase angle 0 to 30 degrees, as voltage XY1 goes from 0 to V1 volts, diode 662 connected to winding 614ZY and diode 664 connected to winding 614ZX are conducting to load resistor 136. As is well known in the art, the resutant voltage at the filter input shown by segment AG of curve 1 is ½ (ZY1+ZX1). Since voltage ZX1 is below the load voltage (curve 1), diode 664 would normally be reverse biased. Due to the commutating action of interphase transformer 685, however, diode 664 is allowed to conduct until voltage XY1 has advanced 30 degrees in phase (i.e., until voltage XY1 begins to rise above voltage ZX1). At this point diode 664 is reverse biased and diode 656 connected to 614XY begins to conduct even though voltage XY1 is below the load voltage. Diodes 662 and 656 continue to conduct until voltage XY1 has advanced 90 degrees in phase. Then voltage ZY1 falls below voltage XZ1 and as a result, diode 662 connected to 614ZY turns off and diode 666 connected to 614XZ turns on. Diodes 666 and 656 continue to conduct until voltage XY1 had advanced 150 degrees in phase. Then voltage XY1 falls below voltage YZ1 and diode 656 connected to 614XY turns off. In summary, it can be seen that during its one-half cycle, phase XY is connected to the load via winding 614XY and diode 656 between the phase angles of 30 and 150 degrees. Since only a minimum voltage is required in this example, silicon controlled rectifier 642 does not conduct.

During the second half cycle of phase XY as shown by curve YX1, phase XY is also connected to the load via 614YX and diode 658 between the phase angles of 210 and 330 degrees. That is, at a phase angle of 30 degrees, voltage YX1 rises above voltage XZ1. Diode 666 then turns off and diode 658 connected to 614YX turns on.

Diode 658 remains conductive until voltage YX1 has advanced 150 degrees in phase. At that time voltage ZY1 rises above voltage YX1 and diode 658 turns off which disconnects phase XY from the load. Phase XY remains disconnected until voltage XY1 advances 30 degrees in phase at which time voltage XY1 exceeds ZX1 and diode 656 begins to conduct again as heretofore described. As during the first half cycle, the silicon controlled rectifier does not conduct.

The main supply operates in a similar manner for each full cycle of phases ZX, YZ to produce the minimum load voltage waveform shown by curve 1 of FIGURE 7.

When the silicon controlled rectifiers are pulsed to provide maximum load voltage, a waveform as shown by curve 3 of FIGURE 7 results. This voltage is derived from six pairs of secondary windings comprising 614XY, 645XY; 614YX, 645YX; 614YZ, 645YZ; 614ZY, 645ZY; 614ZX, 645ZX; and 614XZ, 645XZ. The individual windings in each transformer pair are connected in series so that the voltages induced in the individual windings are added algebraically. The sum of the voltages in each transformer pair for a complete cycle of the XY phase is shown by the six highest curves identified by legend 4 in FIGURE 7. For instance, the sum of the voltages in transformer pair 614XY, 645XY is shown by curve $YX1+XY2$.

The operation of the main supply to achieve the maximum voltage waveform is virtually the same as for minimum voltage except that diodes 655, 659, 663, 665, 661, and 657 are used to conduct the current to the load during the proper time in each cycle and each silicon controlled rectifier is pulsed to provide its maximum possible current flow to the load. This condition corresponds to a zero degree cut-back angle. That is, the firing angle of the gating pulse to each silicon controlled rectifier is delayed or cut back zero degrees so that each silicon controlled rectifier begins to conduct at the earliest possible moment in each cycle. The exact method for effecting a zero degree cut-back angle will be discussed in detail later. In phase XY represented by voltages $XY1+XY2$ and $YX1+YX2$, diode 655 connected to transformer winding 645XY does not begin to conduct until voltage $$XY1+XY2$$

has advanced 30 degrees in phase. At that time voltage $XY1+XY2$ rises above voltage $ZX1+ZX2$ and diode 663 turns off. Since voltage $ZY1+ZX2$ is at a high value at that time, diode 661 is also conducting. Diode 655 continues to conduct until voltage $XY1+XY2$ falls below voltage $YZ1+YZ2$ (i.e., when voltage $XY1+XY2$ has advanced 150 degrees in phase). At that time diode 655 switches off disconnecting phase XY from the load, and diode 659 switches on. Diode 665 is also conducting at this time. During the second half cycle of phase XY represented by voltage $YX1+YX2$ which equals the sum of the voltages in transformer windings 614YX and 645YX, diode 657 turns on after voltage $YX1+YX2$ has advanced 30 degrees and turns off after 150 degrees in phase has been reached. As is well known in the art, the resulting load voltage shown by curve 3 equals one-half the sum of the two voltages in the transformers connected to the simultaneously conducting diodes. For instance, when phase XY is at 40 degrees, diode 655, 661 are conducting and the load voltage equals one-half $[(XY1+XY2)+(ZY1+ZY2)]$.

It will be remembered from the previous discussion that neither voltage XY1 nor $XY1+XY2$ was connected to the load before it had advanced 30 degrees in phase or after it had advanced 150 degrees in phase. Consequently the silicon controlled rectifiers in each phase will not begin to conduct load current before the voltage in its phase has advanced 30 degrees even though it is fired at an earlier time in the cycle. For instance in phase XY, if silicon controlled rectifier 642 is fired before voltage $XY1+XY2$ has advanced 30 degrees in phase, diode 655 will still be cut off and no load current flows through rectifier 642 (assuming that rectifier 642B was fired at some time in the previous cycle and voltage $ZX1+ZX2$ is at the value shown in FIGURE 1 for 0 to 30 degrees). No change in the load voltage waveform will therefore occur.

Figure 8A:
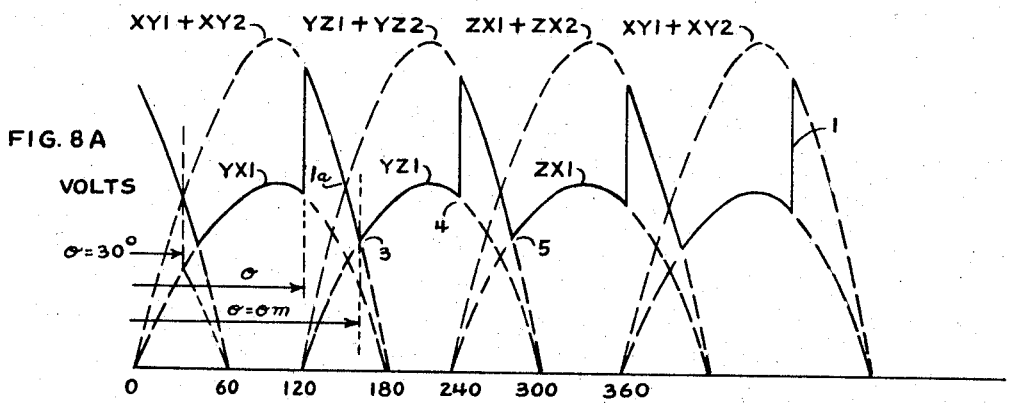
Figure 8B:
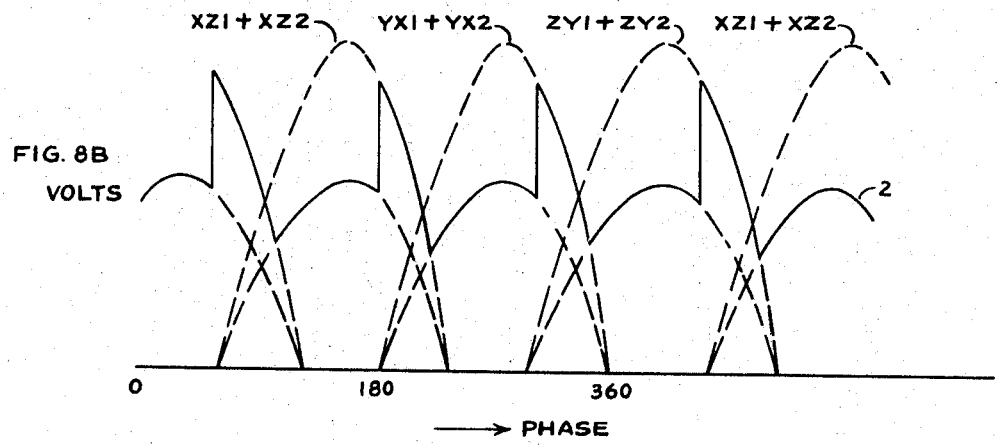

Accordingly, the rectifier will supply its maximum output voltage (curve 3—FIGURE 7) when the silicon controlled rectifiers are pulsed at 30 degrees and will supply its minimum voltage (curve 1—FIGURE 7) when the silicon controlled rectifiers are not fired. The waveforms for a firing phase angle between the minimum angle and maximum are illustrated in FIGURES 8A and 8B. The waveform, curve 1 FIGURE 8A, is the voltage between paths 623 and 687, and the waveform, curve 2 FIGURE 8B, is the voltage between paths 624 and 688. The output voltage at the center tap of interphase transformer 685 is one-half the sum of curves 1 and 2. The maximum phase angle $\sigma_m$ (FIGURE 8A) is a function of the magnitude of the minimum to maximum average voltage ratio. For the curves shown in FIGURES 8A, 8B this maximum value is greater than 150 degrees (a typical value might be $\sigma_m = 157°$). As discussed previously in connection with FIGURE 7, voltage $XY1+XY2$ is disconnected from the load when the voltage YZ1 in phase YZ rises above it and reverse biasses diode 655. This would occur at point 3, FIGURE 8A, if the silicon controlled rectifier 642A was fired at this point. If the rectifier 642A is delayed in firing, assuming it is fired at point 4, FIGURE 8A, this diode 655 becomes reversed biassed at point 3 where the voltage YZ1 becomes greater than $XY1+XY2$. At this time rectifier 642 load current goes to zero. Diode 659 remains nonconductive until rectifier 642A is pulsed on at point 4 FIGURE 8A. Diode 659 and rectifier 642A remain conductive until ZX1 becomes greater than $YZ1+YZ2$ at point 5. The same sequence of operation results for the next phase ZX. The same type of operation also results for phases XZ, YX and ZY as shown by curve 2, FIGURE 8B, but this waveform is displaced 60 degrees with respect to the waveform in FIGURE 8A.

If the firing time is delayed such that rectifier 642A is fired after point 3, FIGURE 8A, then rectifier 655 and 642 will remain nonconductive, and assuming all other silicon controlled rectifiers are fired in 60 degrees of phase difference then the voltage applied to the output will be minimum as shown in FIGURE 7 curve 1.

*General description*

As noted above, an improved control system requires a sensitive and stable direct current voltage error detector and an accurate current sensing device which can detect when a predetermined load current is flowing. A precision timing device is also required to fire the silicon controlled rectifiers at the precise moment dictated by the voltage error and current sensing devices. It is also desirable to provide protection for the controlled rectifiers if one of the input phases should fail.

Referring now to FIGURE 1, a three phase alternating current source XYZ is connected through circuit breaker 101 to primary 102P of a three phase auto transformer 102 at terminals 124, 125 and 126. The aforementioned transformer is used to provide power for the silicon controlled rectifiers in supply circuit 134', for the load 136, and for the control circuit 160. It will be remembered that the exact method of connecting the windings to supply circuit 134' and load 136 was shown in FIGURE 6.

Main supply 134' is connected over paths 135, 137 to load resistor 136. Voltage error detector 145 is connected to load resistor 136 over paths 142 and 141 to provide a voltage error signal as will be explained in connection with FIGURE 4. Current sensing coils 138 provide a current responsive input over paths 140, 139 and 153 to current sensor 143. When a predetermined value of load current is reached, the current sensor 143 provides an output signal which transfers control of the rectifier from voltage control to current control. Under current control, the output voltage of the main power supply 134' is reduced to hold the current from supply 134' to the load close to the predetermined value.

The output of current sensor 143 is connected over path 144 to voltage error detector 145. The output of voltage error detector 145 is connected over path 146 to the input circuit for the six pulse generators 150XY, XZ, YZ, YX, ZX, ZY. The output of each pulse generator 150 XY . . . ZY is connected between the cathode and gate of a silicon controlled rectifier in the main supply circuit 134'. For example, the output 151XY of pulse generator 150XY is connected over path 637 to the cathode of silicon controlled rectifier 642 and to the gate of silicon controlled rectifier 642 by path 638.

Each of the pulse generators 150XY . . . ZY is operative to fire a single silicon controlled rectifier, and since there are two silicon controlled rectifiers, such as 641, 642, for each input phase (one for the positive half cycle and the other for the negative half cycle), six generators 150XY . . . ZY are required for a three phase system. If the six silicon controlled rectifiers 641, 641A, 641B, 642, 642A, 642B (FIGURE 6) are to divide the load current equally, the rectifiers must be fired exactly 60 electrical degrees apart. After the six rectifiers have been fired, 360 electrical degrees or a complete cycle will have been completed.

Gate control for the pulse generators is provided by gate source 110 (FIGURE 1) which is connected over paths 110XY . . . ZY as indicated to each of the pulse generators 150XY . . . ZY. Gate source 110 is energized by power obtained over conductors 107, 108, 109 and circuit breaker 106 from conductors 131, 132, 133 and is operative to provide gating signals to initiate the timing interval for each generator. The magnitude of the timing interval is a function of the error signal from voltage error detector 145. Each gate signal is accurately spaced 60 electrical degrees from the preceding one to insure accurate phasing of the signals from each pulse generator as will be explained in detail hereafter in connection with the specific description of FIGURE 2.

Each pulse generator, such as 150XY, is also connected over a path, such as 161, to the output of a control power supply 116 comprising conductors 117, 118, 119 which provide −20, −24 and −30 volts respectively. Control power supply 116 is in turn connected to derive power from the three phase alternating current input XYZ over secondary windings 102S of transformer 102, over paths 111X, 114Y, 115Z.

Each pulse generator 150XY . . . ZY is also connected over path 123 to a phase failure protect circuit 122. Protection circuit 122 includes a pair of input circuits 114, 115 which are connected across winding 157 of a set of conductive secondary windings 102S on transformer 102, and an input 111 which is connected over circuit breaker 106 and conductor 112 to the junction of windings 155 and 156 of secondary windings 102S so that three phase power is provided over inputs 111X, 114Y, 115Z via circuit breaker 106 whenever transformer 102 supplies power to the load. Protection circuit 122 in turn provides a +5.6 volt supply over path 123 to each pulse generator 150XY . . . ZY. In case any one of the three input phases X, Y, Z fails, or if a circuit breaker trips due to an overload in gate signal source 110, the input to protection circuit 122 reverts to single phase operation. Thereupon protection circuit 122 which is connected over conductors 120, 121 to conductors 119, 118 of power supply 116 immediately clamps the −24 volt supply to ground while maintaining a +5.6 volt supply over path 123 to each pulse generator 150 XY . . . ZY. The outputs of the pulse generators goes to zero and no firing pulses are provided which results in the silicon controlled rectifiers remaining in a cutoff state, as will be explained hereafter in connection with the specific description of FIGURE 3. Assuming now that the load current is below the maximum predetermined level set by current sensor circuit 143 and that load 136 has decreased in value so that more current is required to maintain a constant output voltage, a decreased voltage signal across load 136 is applied over paths 141, 142 to voltage error detector 145. Current sensor 143 detects that the load current has not reached a predetermined maximum value and will remain inoperative. An error signal is sent over path 146 to each of the pulse generators 150 XY . . . ZY which is proportional to the amount of decrease in the load voltage.

As successive gating signals are provided to the pulse generators by the gate signal source 110, each pulse generator 150 XY . . . ZY will in sequence put out a pulse to the gate of its corresponding silicon controlled rectifier after a delay period which is of a length determined by the value of the error signal from said voltage error detector 145. Since an increase in load current is desired, the delay period decreases to allow the associated silicon controlled rectifier to conduct for a large portion of each cycle. As a result the feedback circuit maintains the output voltage constant for load current variations.

As described above, the gating signal from gate source 110 to each pulse generator is 60 degrees out of phase with the signal to the preceding pulse generator. Each generator, therefore, does not begin its timing period until the preceding generator has been operating for 60 electrical degrees. Since the same error signal is put into all generators, the length of the delay period to produce an output pulse in each generator will be the same. Since the gating signals are exactly 60 degrees apart and the timing periods for each generator are identical, the output pulses from the generators must also be 60 degrees apart.

As each silicon controlled rectifier is pulsed by its corresponding pulse generator, current is conducted to load resistor 136 as explained in more detail hereafter in connection with FIGURES 6 and 7.

In a like manner if the load resistance increases so that less current is needed to maintain a constant output voltage, voltage error detector 145 sends an error signal to pulse generators 150XY . . . ZY which increases the delay period before the pulse output by each generator. The period of conduction in each cycle is thus decreased and the load current is reduced.

Assume now that the load resistance 136 decreases to a value such that the current has increased to a predetermined maximum value. If the load current increases to a value greater than this maximum value the current in the current sensing coils 138 increases above a predetermined maximum value and the current sensing circuit 143 applies an error signal over path 144 to the input of 145. The error detector and amplifier sends an error signal to the pulse generators 150XY . . . ZY which increases the pulse delay period. The period of conduction in each cycle of the silicon controlled rectifiers is decreased and the output voltage decreases to maintain the current at the predetermined maximum value. As a result control is transferred from voltage control to current control. If the load resistance 136 later increases, the load current will drop to a value below the maximum value and the output control is transferred back to voltage control to maintain constant voltage across the load.

Assuming now that one of the input phases fails, protection circuit 122 immediately clamps the −24 volt supply to ground while maintaining the +5.6 volt supply to all pulse generators. This terminates the firing pulses and the controlled rectifiers will remain in the non-conductive state until three phase operation is restored.

*Voltage error detector*

Referring to FIGURE 4, the voltage error detector 145 will now be described in detail. The difficulties experienced in the provision of a stable error detector and amplifier in a feedback control system which is reliable over a long period of time under varying temperature conditions are well appreciated in the art. Many of the problems are caused by changes in transistor characteristics due to temperature changes and age. According to the present invention, means are provided in the voltage error detector and amplifier to compensate for these changes in transistor characteristics.

More specifically, the voltage error detector has an input stage comprising a differential amplifier including a pair of transistors 407 and 403, an intermediate amplifier transistor 415, a final amplifier stage comprising transistors 423 and 425, and an output stage comprising an emitter follower transistor 433.

The base of input transistor 403 is connected to the junction of resistor 402 (which is attached to the negative side of the load resistor 136 over path 141) and zener diode 401 which is attached to the positive or ground side of the load resistor 136 over path 142. Zener diode 401 maintains a constant reference voltage from ground to base of transistor 403. The emitter of transistor 403 is connected to the positive side of the load by resistors 405, 404 and to the emitter of transistor 407 by resistors 405 and 406. The collector of transistor 403 is connected to the emitter of amplifier transistor 415 and to the —30 volt supply conductor 119 through zener diode 429 and resistor 431. The base of transistor 407 is connected to the positive side of the load through resistor 408 and potentiometer 409 which adjusts the direct current output voltage level of the rectifier equipment, and to the negative side of the load through potentiometer 409 and resistor 410. The emitter of transistor 407 is connected to the positive side of the load through resistors 406, 404, and to the emitter of input transistor 403 through resistors 406, 405. Resistors 405, 406 increase the gain stability of the differential detector stage. The collector of transistor 407 is connected to the negative side of the load through diode 454 and resistor 455; to the —30 volt supply conductor 119 through resistors 453, 431, and directly to the base of amplifier transistor 415.

The base of amplifier transistor 415 is connected to the collector of transistor 425 by feedback network comprising resistor 413 and potentiometer 414 in series, and resistor 411 and capacitor 412 in series. The base is also connected directly to the collector of transistor 407, to the negative side of the load through diode 452 and resistor 451, and to the —30 volt supply conductor 119 through resistors 450, 431. The emitter of transistor 415 is connected directly to the collector of transistor 403, to the junction of resistor 428 and the cathode of zener diode 429 which provides a constant voltage at the emitter.

The collector of transistor 415 is connected to the collector of transistor 423 through a network comprising capacitor 418, resistors 417, 419, and potentiometer 420. The collector is further connected to the positive side of the load through resistors 417, 416 and to the base of transistor 423 through resistor 417.

The base of transistor 423 is connected to the positive side of the load through resistor 416 and to the emitter of transistor 423 by diode 422. The emitter of transistor 423 is connected directly to the emitter of transistor 425 and to the positive side of the load through resistor 421. The collector of transistor 423 is connected to the collector of transistor 415 through the previously described network consisting of potentiometer 420, resistors 419, 417, and capacitor 418, and is connected to the —24 volt supply through resistor 424. The collector is further connected over resistor 432 to —20 volt supply to develop a direct current control voltage across resistor 432 which is applied to the base of emitter follower transistor 433.

The base of transistor 425 is connected to the junction of resistors 426, 427 which are connected in series between the positive side of the load and conductor 429′. The base of transistor 425 is maintained at a constant voltage with respect to ground by zener diode 430 which is connected across resistors 426, 427. The collector of transistor 425 is connected to the base of transistor 415 by the previously described feedback network consisting of resistors 413, 411, potentiometer 414 and capacitor 412. The collector is further connected over resistor 452 to the conductor 429′. The emitter of transistor 425 is connected to the emitter of transistor 423 and to the positive side of the load by resistor 421.

The base of emitter follower transistor 433 is connected to the collector of transistor 423 and over resistor 432 to the —20 volt supply conductor 117. The emitter of transistor 433 is connected to switch 434 and the collector is connected directly to the —24 volt supply conductor 118. As will be seen, the emitter follower connection of transistor 433 lowers the output impedance of the control voltage source for the pulse generator circuits 150XY . . . ZY. When used as shown in FIGURE 4 (position A), switch 434 connects the output error signal from the error detector circuit to path 146 which distributes the output signal to each of the pulse generators 150XY . . . ZY. When used in position M, switch 434 connects path 146 to potentiometer 439 to provide a manually adjustable error signal to each of the pulse generators. One terminal of potentiometer 439 is connected to the —20 volt supply conductor 117 and the other is connected through resistor 438 to ground. The path 146 is also connected to the junction of resistors 435, 436 which are connected between the —20 volt supply and ground.

In one embodiment, with zero collector current for transistor 423, the control voltage at path 146 is approximately —20 volts. If the collector of transistor 423 is at a higher potential, then the emitter of transistor 433 follows the collector potential of transistor 423. When transistor 423 is fully saturated transistor 433 becomes nonconductive, and the error signal output is approximately —10 volts, this potential being determined by the divider network consisting of resistors 435 and 436.

In operation, changes in output voltage are applied to the differential amplifier 403, 407, and a current change occurs at the collector of transistor 407 which reflects the change in the load voltage. Thus with a decrease in load voltage by reason of an increase in load current, the control circuitry will provide an output signal over conductor 146 to the pulse generators 150XY . . . ZY to effect an increased output by the main power supply circuit 134 in a manner to be described.

Briefly, with a drop in voltage across the load 136, transistor 407 conducts less current, and the collector voltage of transistor 407 (which is the same as the base voltage of transistor 415) becomes lower and transistor 415 also conducts less current. The collector voltage of transistor 415 and the base voltage of transistor 423 are raised which causes transistor 423 to conduct less current. The collector voltage of transistor 423 and the base voltage of emitter follower transistor 433 are lowered and a lower voltage error signal is applied to each pulse generator over path 146. As will be explained in connection with FIGURE 5, an error voltage of lower value causes the pulse generators to fire each silicon controlled rectifier earlier in its cycle. Consequently, more current is applied to the load during each cycle, and the load voltage is raised.

In like manner, with an increase in load voltage, transistors 407, 415, and 423 conduct more current. The error signal voltage is raised and each pulse generator fires its silicon controlled rectifier at a later time in each cycle. Therefore less current flows to the load during each cycle and the load voltage is lowered.

Transistors 403, 407 are connected in a differential amplifier configuration to insure stable low drift detection of the output error signals. This type of connection provides high gain and minimizes the direct current drifts in the output due to base to emitter voltage variation with temperature changes. Since the base-emitter diodes of transistors 407, 403 are connected in opposing directions between the two base input terminals, changes in base-emitter voltage with temperature tend to cancel and lowers the direct current drift at the output of the rectifier equipment. The advantages of using a differential amplifier as a detector are well known in the art. Current for the differential amplifier is supplied through resistor 404. Resistor 405, 406 lowers the gain of the differential detector but increases the gain stability.

The low frequency gain of the amplifier, consisting of transistors 415, 423, 425, is stabilized by the feedback network consisting of resistors 413, 414. Resistor 414 is made adjustable to provide adjustment in the amplifier gain. We assume that the open loop gain of this amplifier is much greater than one. Assume we maintain the collector current of transistor 407 at a constant value, then the voltage at the collector of transistor 423 will be a constant value assuming that the gain remains constant. If the gain of the amplifier changes due to a change in transistor characteristics then the collector voltage of transistor 423 will also change. This change in gain can cause problems in a feedback system by producing changes in dynamic response and feedback stability. If the amplifier gain increases then the collector voltage of transistor 423 becomes more positive. Since transistors 423 and 425 are connected in a push-pull type of connection then the collector of transistor 425 becomes more negative. This results in a lower value of feedback current in resistors 413, 414, thus the total base current of transistor 415 is lowered correcting for the change in gain.

Resistor 455 and diode 454 do not pass current when the voltage on path 141 is at its rated output value. If either one of the sensing leads (paths 141, 142) from the output are opened, diode 454 becomes conductive and saturates the amplifier transistor 415 thus providing a signal which results in maximum firing delay angle. The silicon controlled rectifiers become non-conductive and the output of the equipment drops to its minimum value. This type of operation prevents the rectifier equipment from going to its maximum value and providing excess battery voltage and current if the paths 141, 142 are opened.

Rectifier 422 prevents the charge on capacitor 418 from changing by a large amount for the range of operations of the amplifier between the full on and the full cut-off states, and thereby avoids the occurrence of discrepancy in the delay angle for two silicon controlled rectifiers of the same phase which might otherwise occur.

As noted above, the novel circuitry also includes current sensing means for preventing excess current flow in the load. With reference to FIGURES 6 and 4, one side of a current sensing coil 138 (FIGURE 6) is connected between diodes 449 and 450 of full wave rectifier 441 by path 140, and the other side is connected over path 139, voltage source 440, and path 153 to a point between diodes 451, 452. Source voltage 440 is obtained from a secondary winding in control power supply 116.

The output of rectifier 441 between diodes 452, 449 is connected to ground by path 453. The output between diodes 450, 451 is connected to the base of transistor 447 through resistors 444, 446. Potentiometer 443 and resistor 442 connected across the output of rectifier 441 provide control for the magnitude of the output signal. Capacitor 445, connected from a point between resistors 444, 446 to ground, provides filtering for the output of rectifier 441.

The base of transistor 447 is connected as described above to a point between diodes 450, 451 through resistors 446, 444; the emitter is connected between resistor 408 and potentiometer 409 in the base circuit of transistor 407, and the collector is connected through current limiting resistor 448 to the −20 volt supply conductor 117.

When the load current increases the direct current magnetic field in the current sensing coils 138 also increases. The current sensing coils 138 are excited by an alternating current signal source 440 in series with rectifier circuit 441 and load resistors 442, 443. An ampere-turn balance is maintained between the direct current ampere-turn in the primary or load bus and the alternating current ampere-turns in the secondary coils 138. For example, the peak value of the alternating current in coils 138 is proportional to the direct current in the load resistor 136. If the direct current load current increases, the alternating current in coils 138 also increase. The alternating current is rectified by rectifier 441 and passes through resistors 442 and 443; therefore the direct current voltages across resistors 442 and 443 is proportional to the direct current load. If the load current in resistor 136 is below a predetermined value the potential across resistors 442, 443 is at value such that transistor 447 is cut-off or nonconductive. The base of transistor 447 is positive with respect to the emitter; therefore the error detector and amplifier are controlled by the output voltage over paths 141, 142. If the current increases above the predetermined maximum value the voltage across resistors 442, 443 becomes larger than the voltage across resistor 408; therefore, transistor 447 conducts current and operates as an emitter follower. The voltage at the base of transistor 407 becomes more negative and the feedback amplifier increases the delay time of the pulse generators to drop the magnitude of the output voltage to maintain the load current at its maximum value. The control is now transferred from voltage control to current control, and the feedback circuit will maintain the output current at its maximum value until the magnitude of the load resistance is increased to a value where the control transfers back to voltage control.

The value of load current which causes transistor 447 to conduct is controlled by potentiometer 443. If it is desired to limit the load current to 1600 amperes for instance, potentiometer 443 is adjusted to provide an output from rectifier 441 which will begin to turn on transistor 447 when 1600 amperes is flowing in the load resistor. If slightly more than 1600 amperes begins to flow in the load resistor, the base voltage of transistor 447 will fall below the emitter, and current begins to flow in transistor 447. The base voltage of transistor 407 is reduced and more current flows in the collector of transistor 407.

As previously explained, when transistor 407 conducts more current, transistors 415 and 423 also conduct more and an increased value error signal is sent to each pulse generator. As will be explained in connection with FIGURE 5, an increased error signal delays the firing of each silicon controlled rectifier in each cycle and the load current is therefore reduced to 1600 amperes.

*Pulse generators*

Referring now to FIGURE 5, pulse generator circuit 150XY is shown as basically comprising a switch transistor 501, a gating transistor 505, an amplifying transistor 511, a driver transistor 516, and a transformer 518. Only one pulse generator is shown since the components and operation of remaining pulse generators 150XZ . . . ZY are exactly like generator 150XY.

It will be remembered from the discussion of FIGURE 6 that no load current flows in a silicon controlled rectifier if it is fired before its associated transformer voltage (anode voltage) has advanced 30 degrees in phase from the start of its cycle. Consequently, it is important that a short duration pulse applied to the gate of any silicon controlled rectifier is not applied before the critical 30 degree phase angle has been reached, for if a short pulse is applied too early, the minimum sustaining current needed to maintain conduction is blocked by the rectifier's associated diode, and the rectifier will not conduct. With brief reference to FIGURE 6, for example, diode 655 blocks load current flow through silicon controlled rectifier 642. When the diode is later able to conduct, the gate signal has already decreased to zero, and the silicon controlled rectifier will remain off for the remainder of the cycle.

The timing circuit in each generator includes a capacitive-resistive network which initiates timing responsive to a signal from gate source 110. As will be explained later in connection with FIGURE 2, a gating signal is conducted over path 154 from gate source 110 over resistor 503 to the base of transistor 505 and to the anode of diode 504.

Transistor 505 has an emitter element connected directly to ground and to the cathode of diode 504; and a collector element connected over resistor 510 to the −30 volt supply conductor 119 and to the −20 volt supply conductor 117 through timing circuit 524 comprising diodes 506, 507 connected in series, resistor 509 and capacitor 508. The cathode of diode 507 is connected to the collector of transistor 505 and the anode of diode 506 is connected to the −20 volt supply. Resistor 509 and capacitor 508 are connected in series with capacitor 508 connected across diode 506 and resistor 509 connected across diode 507.

Transistor 501 has an emitter element connected to the junction of the cathode and anode of diodes 506, 507 and also to the junction of resistor 509 and capacitor 508 of timing circuit 524; a base element connected to error signal path 146; and a collector element connected over resistor 502 to the −30 volt supply and to the base of amplifying transistor 511.

Transistor 511 comprises a base connected as previously described; an emitter connected directly to the −24 volt supply conductor 118; and a collector connected over resistor 512 to the emitter of transistor 516 and over capacitor 513 and resistor 514 to the base of transistor 516.

Transistor 516 comprises a base element connected (a) over resistor 515 and path 123 to the +5.6 volt supply in protection circuit 122; (b) over resistor 523 and transformer winding 518–S2 (to ground); (c) over resistor 514 and capacitor 513 to the collector of transistor 511. Transistor 516 also comprises an emitter element connected to ground and through resistor 512, capacitor 513 and resistor 514 to the base of transistor 516; and a collector element connected (a) through resistor 517 and winding 518–P to the −30 volt supply conductor 119, and (b) to the cathode of diode 519. The anode of diode 519 is connected to the −30 volt supply conductor 119.

Winding 518–S1 on transformer 518 has a positive terminal connected through resistor 520 and over path 638 to the gate of silicon controlled rectifier 642, and a negative terminal connected over path 637 to the cathode of silicon controlled rectifier 642. Diode 521 has a cathode connected to the gate of silicon controlled rectifier 642 and an anode connected to the cathode of silicon controlled rectifier 642. Resistor 522 is connected across diode 521.

The manner of operation of pulse generator 150XY is now set forth, the operation of pulse generators 150YZ–ZY being identical to and apparent therefrom.

It will be remembered that each pulse generator, such as 150XY, receives a sine wave signal from gate source 110 to begin a predetermined timing cycle, six signals being provided by the gate signal source in each 360° cycle, the signal to each succeeding generator lagging 60 degrees in phase behind the signal for the preceding generator. The signal from gate source 110 for phase XY is shown in FIGURE 9A. Each generator is operative with receipt of its gating signal to put out one pulse every 360 electrical degrees, whereby the output pulses from the six generators are displaced 60 degrees in phase.

If the sine wave signal from gate 110 is positive, diode 504 conducts the signal to ground and transistor 505 is turned off. As will be shown, capacitor 508 charges toward ground potential upon receipt of a negative signal from the gate source 110. When transistor 505 is turned off, diode 507 is forward biassed and capacitor 508 discharges through diode 507 and resistor 510. The effect of the discharge on the collector voltage of transistor 505 (point B) is shown in FIGURE 9B. After point C (FIGURE 5) has discharged to −20 volts, diode 506 becomes forward biased and prevents the further discharge of capacitor 508.

The timing cycle for generator 150XY begins when the sine wave signal from gate source 110 begins to go negative. At the same time as the sine wave begins to become negative, the anode voltage of silicon controlled rectifier 642 has advanced 30 degrees in phase (FIGURE 9A). This insures that the rectifier 642 will never be fired before diode 655 is able to conduct current to the load (it being remembered that no silicon controlled rectifier can conduct until its anode voltage has advanced 30 degrees in phase).

Diode 504 is then reverse biassed and the base voltage of transistor 505 is allowed to become negative. Transistor 505 turns on and reverse biasses diode 507. Prior to this time it is assumed that point C is approximately −20.6 volts. Capacitor 508 begins to charge through resistor 509, which also reverse biasses diode 506 (FIGURE 9C).

For purposes of this example it is assumed that the error signal impressed on the base of transistor 501 from voltage error detector 145 is −20 volts. It will be remembered that as the load voltage becomes smaller, the error signal from voltage error detector 145 becomes more negative in order to correct for the lower voltage and reaches a minimum value of −20 volts. It will also be remembered that a more negative error signal results in a pulse being sent to each silicon controlled rectifier earlier in its cycle. If a −20 volt error signal is applied to transistor 501, a pulse is sent from generator 150XY at the earliest possible moment in its cycle and the maximum voltage is applied to the load. The resulting waveform is shown by curve 3 of FIGURE 7.

The exact manner of providing the pulse is now described. As stated before, at the beginning of each timing cycle, point C is slightly below −20 volts due to the slight voltage drop across diode across diode 506. If error signal lead 146 connected to the base of transistor 501 is at exactly −20 volts, transistor 501 is turned off.

As soon as transistor 505 is turned on by the sine wave signal from gate source 110, capacitor 508 almost immediately charges enough to overcome the slight voltage across diode 506 and raises point C above −20 volts (i.e., only a brief time period is required to change the voltage from slightly below −20 volts to slightly above −20 volts as the capacitor starts to charge). Transistor 501 then conducts the current in resistor 509 which in turn causes transistor 511 to saturate. The waveform of the pulse signal to the collector of transistor 511 is shown in FIGURE 9D.

The output of transistor 511 is connected to resistor 514 and capacitor 513 which provide a short duration pulse of current to the base of transistor 516. The pulse current in the base circuit of transistor 516 saturates transistor 516 and applies voltage across the primary winding 518–P of transformer 518. The voltage waveforms at the base and collector of transistor 516 and across winding 518–P are shown in FIGURES 9E, 9F, and 9G, respectively. Positive feedback winding 518–S2 supplies the necessary base current through resistor 523 to maintain transistor 516 in a saturated state after the pulse current in resistor 514 and capacitor 513 goes to zero. A voltage pulse is induced in secondary winding 518–S1 and is transmitted to silicon controlled rectifier 642 by paths 637, 638. Rectifier 642 turns on within a few microseconds after the pulse is received and induces voltage XY2 in transformer winding 645XY (FIGURE 6). Voltage XY2 is added to voltage XY1 across winding 614XY and is applied to the anode of diode 655. It will be remembered that after voltage $XY1+XY2$ has advanced 30 degrees in phase it exceeds voltage $ZX1+ZX2$ (FIGURE 7) and diode 655 conducts voltage $XY1+XY2$ to the load.

In the embodiment herein disclosed, transformer 518 transmits a 500 microsecond pulse. After approximately 500 microseconds, transformer 518 saturates, and the voltage across winding 518–P approaches zero. The voltage across winding 518–S2 also approaches zero, and the voltage fed back to the base circuit falls below the value necessary to maintain transistor 516 in saturation. Transistor 516 then turns off and remains off until the next pulse is applied to its base (i.e., 360 degrees later). Although the pulse is removed from the gate of silicon controlled rectifier 642, it will be remembered that the rectifier 642 continues to conduct for the remainder of the cycle as long as positive load current flows.

Diode 519 is used to clamp the collector voltage of transistor 516 at −30 volts after the transistor turns off. Diode 521 prevents the application of a negative signal of excess voltage to the gate of silicon controlled rectifier 642 when transistor 516 turns off. Resistor 522 lowers the gate to cathode impedance for positive gate signals.

In the present embodiment transformer 518 has a small gap to lower the residual flux value and is designed with a square loop iron core of the orthonic type to provide a fast rise in current during saturation.

Assuming that a minimum voltage is required at the load (which minimum is supplied by the main transformer) it will not be necessary to fire the silicon controlled rectifiers, such as 642. In such instance it will be remembered that the error signal from voltage error detector 145 is in the order of −10 volts. Assuming that a −10 volt signal is applied to the base of transistor 501 the potential on the emitter of 501, which is connected to point (C) of capacitor 508, must be within −10 volts or ground before transistor 501 becomes conductive. This signal provides a maximum delay time, a value greater than 127°, and the pulse applied to the gate of controlled rectifier 642 occurs at a time when it is impossible for 642 to pass load current.

The resulting load voltage waveform is shown by curve 1 of FIGURE 7. The exact method of producing this minimum voltage is now set forth. As previously explained, when transistor 505 is turned off at the end of each cycle, capacitor 508 is discharged to approximately −20 volts. Assuming that a −10 volt error signal is on the base of transistor 501, capacitor 508 must charge from −20 to −10 volts before transistor 501 turns on. At the beginning of each timing cycle when the sine wave signal from gate source 110 begins to go negative (and the anode voltage of silicon controlled rectifier 642 has advanced 30 degrees in phase), transistor 505 turns on and capacitor 508 begins to charge. The rate at which capacitor 508 charges is controlled by its value and the value of resistor 509 through which the charging current flows, and it will be apparent from reference to FIGURE 9C that the charge current provides a ramp function (i.e., a substantially linear waveform) as a reliable reference for comparison with the error signal, whereby the effects of transients, harmonics and the like are substantially minimized.

Since minimum load voltage is desired, the values of capacitor 508 and resistor 509 are chosen so that the time required to charge capacitor 508 to −10 volts is the maximum delay time required for minimum output voltage (greater than 127 degrees of delay time). A pulse is then applied to the gate of the silicon controlled rectifier but no load current can flow as previously explained. The resulting load voltage waveform is shown by curve 1 of FIGURE 7.

Assuming that same load voltage between the maximum, curve 3, FIGURE 7, and the minimum, curve 1, FIGURE 7, each silicon controlled rectifier must be fired at the same phase angle between 30 degrees and a maximum which is approximately 157 degrees of its anode voltage waveform. These minimum and maximum conduction angles are illustrated in FIGURE 8 and were discussed previously in connection with FIGURE 7.

The operation of pulse generator 150XY will now be explained assuming that the desired load voltage requires each silicon controlled rectifier to be fired when its anode voltage has advanced 100 degrees in phase. Since pulse generator 150XY starts its timing cycle at a phase angle of 30 degrees, this corresponds to a firing pulse cut-back angle of 70 degrees (100 minus 30 degrees). For explanation purposes, it will be assumed that for a firing delay of 75 degrees, the error signal voltage is approximately −14.2 volts. Before silicon controlled rectifier 642 fires, capacitor 508 must charge from −20 to −14.2 volts. When voltage XY1+XY2 has advanced 30 degrees in phase, the sine wave signal from gate source 110 begins to go negative and transistor 505 turns on. As explained previously, if the error voltage were −20 volts a pulse would be immediately sent to silicon controlled rectifier 642, and voltage XY1+XY2 would then be conducted to the load by diode 655 as soon as it advanced 30 degrees in phase. Since the error voltage is now −14.2 volts, silicon controlled rectifier 642 does not fire as soon as its anode voltage advances 30 degrees in phase, and diode 656 remains non-conducting until voltage XY1 exceeds voltage ZX1+ZX2. This condition, as illustrated by point 3 in FIGURE 8A, does not occur until voltage XY1 has advanced to about 37 degrees in phase.

After transistor 505 is turned on by the gate source signal, capacitor 508 begins to charge. When it reaches −14.2 volts which is the same magnitude as the assumed error signal on the base of transistor 501 transistors 501, 511 and 516 turn on and send a voltage pulse to the gate of silicon controlled rectifier 642 through transformer 518. Rectifier 652 then turns on and a voltage XY2 is induced in winding 645XY. Voltages XY1 and XY2 are then both conducted to the load through diode 655 as shown at point 4 in FIGURE 8A. Silicon controlled rectifier 642 remains conductive until point 3 when voltage YZ1 rises above voltage XY1+XY2. The circuitry is thus operative to control the firing of the silicon controlled rectifiers in such manner as to provide the differential power which is required above the minimum to maintain the output voltage fixed for variations in line voltage and load current.

Since transistor 505 operates in an on-off mode in response to a sinusoidal signal over path 154, the following advantages results: (1) the collector voltage waveform of transistor 505 is relatively independent of the input waveform since 505 is operated in a switching mode, (2) the collector voltage magnitude is a function of charging and discharging circuit parameters and direct current bias supply potentials. Accordingly, with the transistor driven hard into saturation or cut-off, transients or harmonics of magnitudes normally encountered would have no effect on the magnitude or waveform of the collector voltage of transistor 505.

*Gate source*

Figure 2:
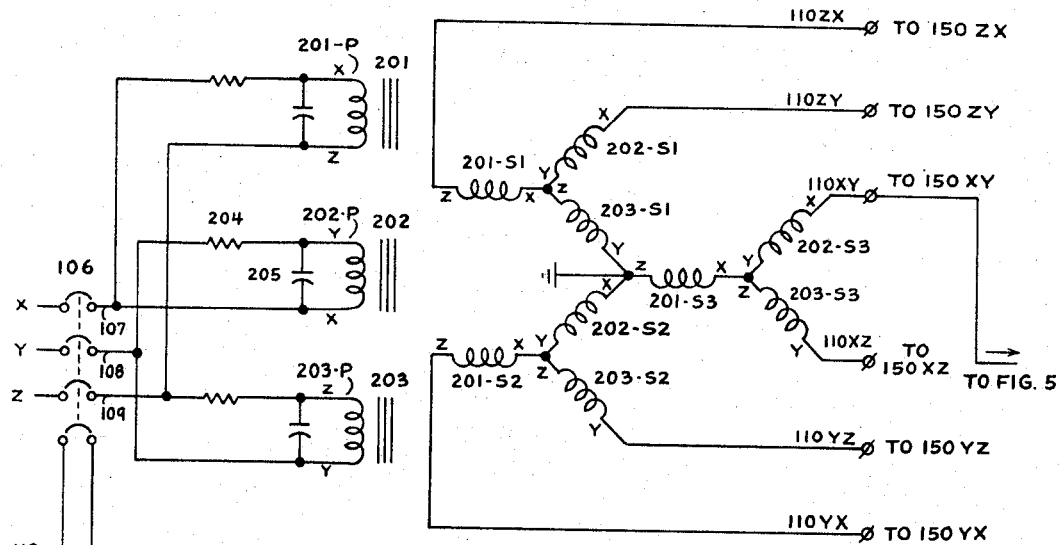
FIGURE 2 shows a novel gate signal source used to set and reset the timing cycle of the pulse generator gates.

Referring now to FIGURE 2, gate source 110 is therein disclosed. Gate source 110 has three small single phase transformers 201, 202, 203 having primary windings 201–P, 202–P, and 203–P respectively. Each primary winding is connected to a different input phase through circuit breaker 106 and through a resistor-capacitor combination; the primary of each transformer and the capacitor in parallel are tuned at the fundamental frequency (in this case 60 cycles per second). In phase XY, for example, connected to winding 202–P, resistor 204 is connected in series with the winding and capacitor 205 is connected in parallel. Since the rates of rise and fall of line currents in a controlled rectifier circuit are fast, and the magnitude of current change is large, low and high frequency harmonics can be impressed on the line voltage. If the voltage waveform is distorted, some phase shifting in opening and closing the gates of the silicon controlled rectifiers is experienced. As pointed out before, if the silicon controlled rectifiers are gated too early or too late, a significant error in the output voltage may result and an unbalanced condition may exist in the silicon controlled rectifier firing. The input circuit consisting of resistor 204, capacitor 205 and primary winding 202–P is tuned to pass the fundamental frequency and attenuate higher frequency harmonics. Each of the transformers 201, 202, and 203 includes three secondary windings connected as shown to provide six signals evenly spaced 60 degrees in phase, each signal leading its associated line voltage by 150°. For instance, in phase XY, output path 154 is connected to ground through windings 202–S3 and 201–S3. The output signal on conductor 154 is 60 degrees out of phase with outputs 110ZY, 110XZ and leads input voltage XY by 150 degrees. Assuming that the phase XY voltage is represented by the function $E \sin W\omega t$ in which XY voltage means the voltage of X with respect to Y, the gate signal at output XY equals $+Eg$ sine $(\omega t + 150°)$ so that the enabling of the pulse generator circuit of FIGURE 5 occurs 30 degrees after the XY phase becomes positive.

This 30 degree difference was chosen in this embodiment since each silicon controlled rectifier can begin to conduct only after its anode voltage has advanced 30 degrees in phase. For other types of main supplies, a different phase angle may be chosen.

Other outputs are in a similar relationship with their associated input phases. Accordingly each output is connected to ground through two secondary windings as follows:

Output 110ZX is connected to ground through windings 201–S1, 203–S1; output 110ZY through windings 202–S1, 203–S1; output 110XY through windings 202–S3, 201–S3; output 110XZ through windings 203–S3, 201–S3; output 110YZ through windings 203–S2, 202–S2; and output 110YX through windings 201–S2, 202–S2.

As noted above, as the negative potrion of each of the sine wave signals is provided over the successive conductors 110ZX–YX in the spaced time interval to each pulse generator, a timing cycle begins for the purpose of providing a cutback angle α related in value to the magnitude of the error signal.

*Protection circuit*

Referring now to FIGURE 3, the novel phase failure protection circuit 122 will be derscie bd in detail. The protection circuit 122 comprises as inductive secondary 102S of transformer 102 including windings 155, 156, 157 connected to the inputs of a three phase full wave rectifier 301. A first input 115 is connected between the junction of diodes 320, 323 and the junction of windings 156, 157; a second input 114 is connected from the junction of diodes 319, 322 to the junction of windings 155, 157; and a third input 111 is connected through circuit breaker 106 from the junction of diodes 321, 324 to the junction of windings 155, 156. It will be noted that if circuit breaker 106 is opened, only winding 157 remains connected to the input, and protect circuit 122 then reverts to single phase operation.

Diodes 319–324 are connected to form a three phase full wave rectifier which is used to provide direct current voltages to the rest of the protection circuit. Resistor 302, RC circuit 304, 305, and diode 303 are connected across the diode pairs of the three phase rectifier 301 and are operative with resistor 307 to supply the signal output thereof to transistor 308 for control of transistors 313, 317 as will be shown.

Transistor 308 comprises (a) a base element connected to the cathodes of diodes 319, 320, 321 through resistors 305, 307 and diode 303, and also connected to ground through capacitor 304 and resistor 307; (b) an emitter element connected through resistor 309 to the +5.6 volt supply conductor 123 and to ground through resistor 310; and (c) a collector element connected to the base of transistor 313 and to the —30 volt supply through resistor 312. Diode 306 is connected in series with the +5.6 volt supply between resistors 305 and 309.

Transistor 313 includes a base connected as previously described; an emitter connected through diode 314 to the —30 volt supply; and a collector connected through resistors 315 and 316 to the +5.6 volt supply conductor 123 and to the base of transistor 317 through resistor 315.

Transistor 317 has a base element connected as heretofore described, and collector element connected to the —24 volt supply. The emitter element of transistor 317 is connected to ground and also connected through capacitor 318 to the +5.6 volt supply.

Briefly, if any one of the three phases of the input fails, the novel protect circuit reverts to single phase operation and immediately clamps the —24 voltage supply to ground. As a result, the transistors, such as 516, in pulse generators, such as 150XY, are prevented from operating and the silicon controlled rectifiers, such as 641, 642, will be turned off at the end of their cycle and remain in a cut-off state to protect them from overload damage.

With reference to FIGURE 3, the specific operation of protection circuit 122 is now explained in detal. Assuming that all three phases of input and gate source 110 are operative, transformer secondary 102S has a three phase voltage induced in it, and full wave rectifier 301 puts out a 5.6 volt direct current voltage with six phase ripple. In response to this signal, capacitor 304 slowly charges to approximately +5.6 volts through resistor 305. As long as the output of rectifier 301 contains six phase ripple voltage, the voltage across capacitor 309 can never be more than a few tenths of a volt below +5.6 and transistor 308 remains turned off.

When all three input phases are operative, transistor 308 is turned off since the capacitor 304 voltage is only a few tenths of a volt below the supply voltage. Transistors 313 and 317 are also turned off and the —24 volt supply is not connected to ground. The pulse generators therefore function normally.

Assuming that one of the input phases fails, the rectifier circuit 301 supplies single-phase rectified power to the protect circuit. The magnitudes of resistor 302 and capacitor 304 are such that the discharge time constant is less than one-half period of the single phase input. Thus, for single phase operation, capacitor 304 discharges rapidly through diodes 303 and resistor 302 as the input voltage approaches zero. When the line voltage rises toward its peak value capacitor 304 remains at a low value since resistors 305 and 307 are large in magnitude. The voltage across capacitor 304 remains at a low average value compared with 5.6 volts and provides positive base current for transistor 308 through resistor 307. Diode 306 becomes reversed biassed when the input voltage drops below 5.6 volts and prevents the resistor 302 from discharging capacitor 318. The voltage across capacitor 318 remains at approximately 5.6 volts also during single-phase operation thus providing the necessary bias currents for transistors 308, 313 and 317. When transistor 308 turns on transistor 313 also turns on. Transistor 317 also conducts and clamps the —24 volt supply conductor 118 directly to ground. If the —24 volt supply conductor 118 is clamped to ground, the emitter of transistor 511 (FIGURE 5) is also at ground and transistor 511 will not operate, so that no further pulses are sent to silicon controlled rectifier 642. The remaining pulse generators behave in a similar manner to remove pulses to their associated silicon controlled rectifiers.

Assuming gate source 110 is overloaded, circuit breaker 106 opens and only the voltage across winding 157 is applied to the full wave rectifier 301.

As previously described, the capacitor 304 voltage goes to a low value which turns on transistor 308. Transistors 313 and 317 also turn on and clamp the —24 volt supply to ground, and the pulse generators are turned off as previously described.

While what is described is regarded to be a preferred embodiment of the invention, it will be apparent that variations, rearrangements, modifications and changes may be made therein without departing from the scope of the present invention as defined by the appended claims.

What is claimed is:

1. A control circuit for controlling the supply of power to a load from a source which provides a multi-phase current, a plurality of switching means connected between said source and said load, error detector means connected to said load to sense the average value of a predetermined load characteristic including means for producing an error signal which varies with the amount of deviation of said characteristic of the power to the load from a predetermined value, gate signal source means connected to said source including means for providing a signal at least once in each cycle of each phase and a plurality of output circuits including at least one circuit for each of the different output signals, pulse generator means including at lease one pulse generator circuit for each phase, each having one input circuit connected to the output of said error detector means, and a second input connected to an output circuit of said gate signal source, the second input of different pulse generator circuits being connected to different ones of said gate signal source output circuits, and waveform generator means in said pulse generator means for generating a ramp waveform responsive to receipt of said signal over said second input, and comparer means for comparing said ramp waveform with the signal received over said first input circuit, and means for generating an output pulse controlled by said comparer means responsive to a predetermined relationship between said error signal and said ramp waveform and means connecting said output pulse output of each pulse generator to control an associated one of said switching means.

2. A control circuit for controlling the supply of power to a load from a source which provides n-phase current, control circuit means including at least "$n$" switching means connected between said source and said load, each of which "$n$" switching means controls the switching of current of a different phase from the source to the load, error detector means connected to said load including means for producing an error signal which varies with the amount of deviation of a characteristic of the power to the load from a predetermined value, gate signal source means connected to said source including means for providing a signal at least once in each cycle of each phase and a plurality of output circuits including at least one circuit for each of the different phases, pulse generator means including at least one pulse generator circuit for each phase, each having one input circuit connected to the output of said error detector means, a second input connected to an output circuit of said gate signal source, the second input of different pulse generator circuits being connected to different ones of said gate signal source output circuits, and waveform generator means in said pulse generator means for generating a ramp waveform responsive to receipt of said signal over said second input, and comparer means for comparing said ramp waveform with the signal received over said first input circuit, and means for generating an output pulse controlled by said comparer means responsive to a predetermined relationship between said error signal and said ramp waveform means connecting the output pulse of each pulse generator to control an associated different one of said switching means, and blocking oscillator means responsive to said output pulse to generate a sharp pulse to control its associated switching means.

3. An arrangement as set forth in claim 2 in which said source provides three phase current, and in which said control circuit means prepares said pulse generator circuit means to operate its associated switching means only after thirty degrees of the phase controlled thereby.

4. A control circuit as set forth in claim 2 in which said source provides three phase current, and each of said switching means includes two silicon controlled rectifiers, and in which said pulse generator means includes six pulse generator circuits, each of which controls switching of a different one of said rectifiers.

5. A control circuit as set forth in claim 1 in which said switching means includes six switching devices and said gate signal source comprises three single phase transformers, each of which includes a tuned circuit and a primary winding connected to a different phase of said source, and three secondary windings connected to provide six signals spaced sixty degrees in phase, each signal being thirty degrees out of phase with its associated line voltage.

6. A control circuit for controlling the supply of power to a load from a source which provides multiphase current, a plurality of switching means connected between said source and said load, error detector means including means connected to said load including means for producing an error signal which varies with the amount of deviation of a characteristic of the power from a predetermined value, gate signal source means connected to said source including means for providing a signal at least once in each cycle for each phase, and a plurality of output circuits including at least one circuit for each of the different phases, pulse generator means including at least one pulse generator circuit for each phase, each having one input circuit connected to the output of said error detector means, and a second input connected to an output circuit of said gate signal source, the second input of different pulse generator circuits being connected to different ones of said gate signal source output circuits, means connecting the output circuit of each pulse generator to control an associated one of said switching means, phase protection means including circuit means for connecting said protection means for energization by said multiphase source, and means for interrupting operation of said pulse generator means responsive to failure of one of said phases.

7. A control circuit as set forth in claim 6 which includes a circuit breaker connected between said gate signal source means and said source, and in which said control circuit means includes contact means on said circuit breaker connected in one phase of the energizing circuit to said protector means.

8. A control circuit as set forth in claim 7 in which said means in said gate signal source means provides an output signal for each phase which lags in its line voltage by thirty degrees.

9. An arrangement as set forth in claim 6 in which said characteristic is the current supplied to said load, and said means in said error detector means produces an error signal responsive to a current which is greater than a predetermined value.

10. An arrangement as set forth in claim 6 in which said characteristic is the voltage across said load, and said means in said error detector means provides an error signal responsive to variation of said voltage above and below a predetermined value.

11. A control circuit for controlling the supply of power to a load from a source which provides an n-phase current, circuit means including at least "$n$" switching means connected between said source and said load, error detector means connected to said load including means for producing an error signal which varies with the amount of deviation of a characteristic of the power from a predetermined value, pulse generator means including at least one pulse generator circuit for each phase, each of which includes waveform generator means for generating a ramp function which is referenced to an associated phase of said n-phase current, means for comparing said ramp function waveform with said error signal, and pulse means for providing an output pulse after a time delay in its associated phase which is related to the value of said error signal, means connecting the output pulse of each pulse generator to an associated one of said switching means, and means in said control circuit means for enabling said waveform generator means to initiate generation of said ramp function only after the occurrence of "x" degrees in the phase which is switched thereby.

12. A control circuit for controlling the supply of power to a load from a source which provides a multiphase current, circuit means including a plurality of switching means connected between said source and said load, error detector means connected to said load including means for producing an error signal which varies with the amount of deviation of a characteristic of the power from a predetermined value, pulse generator means including at least one pulse generator circuit for each phase, each of which provides an output signal after a time delay in its phase which is related to the value of said error signal, means connecting the output circuit of each pulse generator to an associated one of said switching means, and means coupled to each of said phases to detect failure of one of said phases including means connected to said pulse generator means to disable said pulse generator means with detection of the failure of one of said phases.

13. A control circuit for controlling the supply of current to a load from a source which provides a multiphase current, a plurality of switching means connected between said source and said load, current detector means connected to said load including means for producing an error signal only responsive to a load current which exceeds a predetermined value, pulse generator means including at least one pulse generator circuit for each phase, each having an input circuit connected to the output of said current detector means, and timing means responsive to said error signal for providing a signal at a later time in its phase, and means connecting the output signal of each pulse generator to control an associated one of said switching means, said delayed signal resulting in later firing of said switching means in its phase and a reduced current to the load.

14. A control circuit for controlling the supply of current to a load from a source which provides a multiphase current, circuit means including a plurality of switching means connected between said source and said load, current detector means connected to said load including means for providing an alternating current signal which varies with the current to said load, bridge means for providing a direct current signal having a value related to said alternating current signal, switch means operative responsive to said direct current signal having a value greater than a predetermined value, means controlled by operation of said switch means to provide an error signal, pulse generator means including at least one pulse generator circuit for each phase connected for control by said error signal, and means connecting the output circuit of each pulse generator to an associated one of said switching means.

15. A control circuit for controlling the supply of power to a load from a source which provides a multiphase current, circuit means including a plurality of switching means connected between said source and said load, error detector means connected to said load including means for producing an error signal which varies with the amount of deviation of a characteristic of the power from a predetermined value, pulse generator means including at least one pulse generator circuit for each phase, each of which circuits comprises timing means including a capacitor, a charging circuit and a discharge circuit for said capacitor, gate signal source means for providing a signal at least once in each cycle of each phase, means connected to said gate signal source means for enabling said charge circuit at a predetermined time in each cycle, switch means connected to turn on responsive to charge of said capacitor to a value determined by the value of said error signal, different error signal resulting in switch turn-on at correspondingly different periods of time in the phase cycle, and means for providing an output pulse responsive to operation of said switch means the different times of operation of said switch means varying the time of generation of said output pulse in a phase cycle, and means connecting the output pulse of each pulse generator to control switching of an associated one of said switching means.

16. A control circuit as set forth in claim 15 which includes gate signal source means for enabling said charging circuit at a predetermined interval after the start of one half cycle of the phase controlled by the pulse generator, and in which said means for said discharge circuit are operative at the same interval after the start of the other half cycle of said phase.

17. A control circuit for controlling the supply of power to a load from a source which provides a multiphase current, circuit means including a plurality of switching means connected between said source and said load, error detector means connected to said load including means for producing an error signal which varies with the amount of deviation of a characteristic of the power from a predetermined value, pulse generator means including at least one pulse generator circuit for each phase, each of which includes timing means for measuring a time period related to the value of said error signal, means for initiating operation of said timing means a predetermined interval after the start of a half cycle of the phase controlled by said pulse generator circuit, pulse means for generating an output pulse in response to completion of measurement of each such time period, means connecting the output pulse of each pulse generator to an associated one of said switching means, and means in said circuit means for conditioning each switching means for operation by said output signal only after the elapse of the given number of degrees of the phase controlled thereby.

18. A control circuit for controlling the supply of power to a load from a source which provides multiphase current, circuit means including a plurality of switching means connected between said source and said load, error detector means connected to said load including means for producing an error signal which varies with the amount of deviation of a characteristic of the power from a predetermined value, pulse generator means including at least one pulse generator circuit for each phase, each of which provides an output signal after a time delay in its associated phase which is related to the value of said error signal, means connecting the output circuit of each pulse generator to an associated one of said switching means, and phase failure protection means for interrupting operation of said pulse generator means responsive to failure of one phase including other switch means for effecting disablement of said pulse generator circuits, and phase detector means for detecting failure of any one of said phases including means for operating said other switch means with detection of a failure.

19. A control circuit as set forth in claim 18 in which said source provides three phase current, and in which said phase failure detector means comprises a capacitor including a charging circuit, a three phase full wave rectifier for providing direct current voltage of a given value to said charging circuit with the presence of each phase, and means for maintaining said other switch means disabled with supply of said voltage of given value to said capacitor, and enabled with lack of supply of said voltage of given value due to loss of a phase.

20. A control circuit for controlling the supply of power to a load from a source which provides a multiphase current, circuit means including a plurality of switching means connected between said source and said load, error detector means connected to said load including means for producing an error signal which varies with the amount of deviation of a characteristic of the power from a predetermined value, pulse generator means including at least one pulse generator circuit for each phase, each of which circuits comprises timing means including a capacitor, a charging circuit and a discharge circuit for said capacitor, means for enabling said charge circuit at a predetermined time in each cycle comprising an on-off switching device operative in the conductive state to enable said charging circuit, and source means for providing signals for alternatively driving said switching device hard into saturation or cutoff.

21. A control circuit as set forth in claim 20, in which said multiphase source comprises a third phase source and which includes a gate signal source for said pulse generator circuit including a transformer having three separate primary windings, each of which is tuned to pass the fundamental frequency and to attenuate higher frequency harmonics.

References Cited
UNITED STATES PATENTS

| | | | |
|---|---|---|---|
| 3,040,239 | 6/1962 | Walker | 323—43.5 X |
| 3,099,785 | 7/1963 | Kessler et al. | 321—18 |
| 3,263,157 | 7/1966 | Klein | 323—43.5 X |
| 3,246,227 | 4/1966 | Strohmeier et al. | 321—11 |

JOHN F. COUCH, *Primary Examiner.*

W. H. BEHA, *Assistant Examiner.*